United States Patent [19]
Komuro et al.

[11] 4,427,831
[45] Jan. 24, 1984

[54] RUBBER MATERIALS HAVING EXCELLENT GRIP ON ICE

[75] Inventors: Keiji Komuro; Akio Ueda, both of Yokohama, Japan

[73] Assignee: Nippon Zeon Co. Ltd., Tokyo, Japan

[21] Appl. No.: 288,548

[22] Filed: Jul. 30, 1981

Related U.S. Application Data

[63] Continuation of Ser. No. 102,848, Dec. 12, 1979, abandoned, which is a continuation of Ser. No. 899,693, Apr. 24, 1978, abandoned.

[30] Foreign Application Priority Data

Apr. 27, 1977 [JP] Japan .................................. 52-48870

[51] Int. Cl.³ .......................... C08L 7/00; C08L 9/00; C08L 9/06
[52] U.S. Cl. .................................... 525/211; 152/210; 36/32 R; 525/236; 525/237; 523/156
[58] Field of Search ................ 525/210, 211; 152/210; 36/32 R

[56] References Cited

U.S. PATENT DOCUMENTS

| 2,672,910 | 3/1954 | Corson ................. | 152/211 |
| 2,690,461 | 9/1954 | Steeves ................ | 152/211 |
| 3,115,178 | 12/1963 | Tomarkin ............ | 152/211 |
| 3,227,200 | 1/1966 | Andy ................... | 152/211 |
| 3,546,183 | 12/1970 | Solaux et al. ........ | 526/90 |
| 3,562,193 | 2/1971 | Leeks et al. ......... | 525/236 |
| 3,919,130 | 11/1975 | Cohen ................. | 525/237 |
| 4,166,083 | 8/1979 | Ueda et al. .......... | 525/210 |

FOREIGN PATENT DOCUMENTS

| 50-59441 | 5/1975 | Japan ................... | 525/210 |
| 7004377 | 10/1970 | Netherlands ........ | 525/210 |

Primary Examiner—Wilbert J. Briggs, Sr.
Attorney, Agent, or Firm—Sherman & Shalloway

[57] ABSTRACT

A rubber material having an excellent grip on ice comprising a mixture of an ordinary rubber and a powdered polymer, said powdered polymer having a maximum of tan δ at a temperature in the range of −5° C. to +35° C. when the tan δ is measured by a nonresonance, forced vibration apparatus at a frequency of 110 hertz and a heating rate of 2° C./minute.

8 Claims, No Drawings

RUBBER MATERIALS HAVING EXCELLENT GRIP ON ICE

This is a continuation of application Ser. No. 102,848, filed Dec. 12, 1979, which in turn is a continuation of application Ser. No. 899,693, filed on Apr. 24, 1978, both now abandoned.

This invention relates to rubber materials having an excellent grip on ice.

Known methods for preventing tires and other rubber articles from slipping on roads covered with ice or snow include (1) attaching of spikes to their surfaces (e.g. Japanese Patent Publication No. 71003/75), (2) incorporation of a hard powder, such as glass or sand (e.g. Japanese Patent Publication No. 31732/71), (3) insertion of steel wires (e.g. Japanese Patent Publication No. 52705/75) and (4) production of these articles from a polymer having a high grip on ice. The articles obtained by the methods (1) to (3), however, damage objects in contact with the articles in an atmosphere above room temperature and free of ice. For instance, a tire scars the road surface, causing a hydroplaning phenomenon, and a shoe sole causes damage to a floor covering. With the method (4), on the other hand, a marked improvement in ice grip is difficult to achieve.

The object of the present invention, therefore, is to provide rubber materials capable of affording rubber articles which have an excellent grip on ice and cause no damage to surfaces in contact with the articles.

We have found that the above object can be attained by incorporating in an ordinary rubber a powdered polymer which hardens at service temperatures on ice and softens at higher temperatures. Thus, the present invention provides a rubber material which is a mixture of an ordinary rubber and a powdered polymer, said powdered polymer being characterized in that its loss tangent (tan $\delta$) is at a maximum at a temperature in the range of $-5°$ C. to $+35°$ C. when its tan $\delta$ is measured by a nonresonance, forced vibration apparatus at a frequency of 110 hertz and a heating rate of $2°$ C./min.

When the dynamic mechanical properties of a polymer are measured by a nonresonance, forced vibration apparatus at a constant frequency of vibration to check for their dependence on temperature, it is generally observed that the tan $\delta$ has a maximum value in a temperature region in the vicinity of the glass transition temperature of the polymer. MECHANICAL PROPERTIES OF POLYMERS, pages 146 and 163 (Reinhold Publishing Corporation, 1962), for instance, gives a detailed description of examples of the measuring method and the results of measurements. Such methods well known in the art are employed to perform measurements for defining the powdered polymer of the present invention.

Polymeric materials which harden at service temperatures on ice, or at temperatures which they experience on ice, and which soften at room temperatures are known. These polymeric materials have glass transition temperatures or crystallization temperatures falling between the hardening temperature and the softening temperature. However, when these polymeric materials are kneaded with rubber, they either disperse in the rubber finely in sizes on the order of several microns or become compatible with the rubber; therefore, the addition of these polymeric materials cannot afford rubber articles having an improved grip on ice (see Sample Nos. 2 and 3 of Example 1 to appear later).

According to the present invention, a crosslinked powdered polymer or a very high-molecular-weight, uncrosslinked powdered polymer having an average molecular weight higher than 200 million, each of which does not lose the shape of powder due to heat experienced during shaping or curing is added to rubber in order to prevent such excessive fine dispersion or dissolution. The particle size of the powdered polymer is larger than 0.1 mm. The crosslinked powdered polymer refers to a powder of a crosslinked product obtained by heating rubber, if desired, in the presence of an ordinary crosslinking agent and other compounding agents.

The powdered polymer of the present invention, as has been earlier defined, must have a maximum tan $\delta$ at a temperature within the range of $-5°$ C. to $+35°$ C. If rubber is mixed with the powdered polymer having a maximum tan $\delta$ at a temperature below $-5°$ C., a rubber article produced from the mixture cannot have an improved grip on ice. If rubber is mixed with the powdered polymer having a maximum tan $\delta$ at a temperature above $+35°$ C., a rubber article formed from the mixture considerably damages the surface of an object which the article contacts.

Examples of the powdered polymer usable in the present invention include a copolymer of styrene or α-methylstyrene with a conjugated diene such as butadiene or isoprene, the content of the styrene unit being relatively high; a high vinyl butadiene polymer; and a norbornene polymer disclosed, for example, in U.S. Pat. No. 3,546,183. Any other polymers are unable which satisfy the aforementioned definition.

For production of tires, the use of those polymers which have a tan $\delta$ maximum measured at a relatively high temperature near $+35°$ C. is preferred so as to cope with heat build-up during running.

The amount of the powdered polymer is 5 to 100 parts by weight, preferably 5 to 50 parts by weight, per 100 parts by weight of rubber as a substrate.

The powdered polymer and ordinary compounding agents for rubber, such as curing agents, fillers, and process oils, are added to an ordinary synthetic rubber, such as styrene-butadiene copolymer rubber, butadiene rubber, or isoprene ruber, or natural rubber to produce the rubber material of the present invention. Shaping and heating of this rubber material afford a rubber article having a good grip on ice and causing no damage to the surface in contact with the article in an atmosphere having a higher temperature than the service temperature on ice.

The following Examples illustrate the present invention. The parts therein are by weight.

EXAMPLE 1

Sixty parts of an aromatic process oil was caused to be absorbed by 100 parts of a norbornene polymer(-polymer of 5-norbornene, NORSOREX, a trademark for a product of CdF Company, France) at $50°$ to $60°$ C. for 2 hours. The norbornene polymer was then kneaded on a mixing roll heated at $80°$ to $90°$ C. to prepare an oil-extended norbornene polymer I.

A powdered norbornene polymer II was prepared by passing a volcanizate of an oil-extended norbornene polymer through the narrow gap of a mixing roll. The volcanizate of an oil-extended norbornene polymer was prepared by vulcanizing the following polymer composition while pressing at $145°$ C. for 10 minutes: Norbornene polymer 100 parts, zinc oxide 3 parts, stearic acid 1 part, ISAF carbon black 30 parts, silica filler 10 parts, aromatic process oil 40 parts, sulfur 2 parts, H-cyclohexyl-2-benzothiazole sulfenamide 1.5 parts, and triethanolamine 1 part.

An oil-extended styrene-butadiene copolymer rubber (SER 1712, containing 37.5% by weight of a high aromatic oil) and the oil-extended norbornene polymer I or the powdered Norbornene polymer II were mixed by a B-type Banbury mixer in the proportions shown in Table I. At the same time, various compounding agents were added in the amounts shown in Table I. Then, the rubber compositions were vulcanized by pressing at 145° C. for 45 minutes. The resulting vulcanizates had the properties shown in Table I.

TABLE 1

| | Sample No. | | | |
|---|---|---|---|---|
| | Comparison | | | Present Invention |
| | 1 | 2 | 3 | 4 |
| Recipe & physical properties | | | | |
| SPE 1712 (parts) | 100 | 90 | 80 | 100 |
| Oil-extended norbornene polymer I*1 (parts) | — | 10 | 20 | — |
| Powdered norbornene polymer II*2 (parts) | — | — | — | 30 |
| Compounding Agents (parts) | | | | |
| Zinc oxide | | | 3 | |
| Stearic acid | | | 2 | |
| ISAF carbon black | | | 60 | |
| Aromatic process oil | | | 5 | |
| N—Phenyl-N—isopropyl-p-phenylenediamine | | | 1 | |
| Phenyl-β-naphthylamine | | | 1 | |
| 6-Ethoxy-2,2,4-trimethyl-1,2-dihydroquinoline | | | 1 | |
| Sulfur | | | 1.7 | |
| N—Oxydiethylene-2-benzothiazole sulfenamide | | | 1.1 | |
| Hardenss (JIS) | 66 | 66 | 70 | 64 |
| Skid resistance on ice*3 | 4 | 4 | 3 | 9 |
| Occurence of scratch*4 | NO | NO | NO | NO |

Table 1 shows that the rubber material of the present invention gives a vulcanizate having an excellent skid resistance on ice and causing no damage to an acetate film; in contrast, the comparisons containing the same polymer as the powdered polymer of the Example of the present invention, but unpowdered, do not have an improved skid resistance on ice.

EXAMPLE 2

Synthetic cis-1,4-polyisoprene rubber (NIPOL IR 2200, a trademark for a product of Nippon Zeon Co., Ltd.) and the oil-extended norbornene polymer I or the powdered norbornene polymer II prepared in Example 1 were mixed by a B-type Banbury mixer in the proportions shown in Table 2. At the same time, various compounding agents were added in the amounts shown in Table 2. Cured products obtained by pressing the resulting compositions at 145° C. for 35 minutes were tested for hardness, skid resistance on ice, and occurrence of scratch. The results are shown in Table 2.

TABLE 2

| | Sample No. | | |
|---|---|---|---|
| | Comparison | | Present Invention |
| | 1 | 2 | 3 |
| Recipe & Physical properties | | | |
| IR 2200 (parts) | 100 | 80 | 100 |
| Oil-extended norbornene polymer I (parts) | — | 20 | — |
| Powdered norbornene polymer II (parts) | — | — | 30 |
| Compounding Agents (parts) | | | |
| Zinc oxide | | 5 | |
| Stearic acid | | 2 | |
| HAF carbon black | | 50 | |
| Aromatic oil | | 5 | |
| Diphenyl guanidine | | 1 | |
| Sulfur | | 2.3 | |
| N—Oxydiethylene-2-benzothiazole sulfenamide | | 1 | |
| Hardness (JIS) | 65 | 73 | 65 |
| Skid resistance on ice | 3 | 3 | 10 |
| Occurrence of scratch | NO | NO | NO |

EXAMPLE 3

Powdered styrene-butadiene copolymers (size: 25-mesh through) were prepared by passing vulcanizates of a styrene-butadiene copolymer through the narrow gap of a mixing roll.

The vulcanizates of a styrene-butdiene copolymer were prepared by mixing 100 parts of a styrene-butadiene copolymer—which has a styrene-butadiene ratio of 55/45, 60/40, 66/34, 71/29, 77/23 or 88/12 by weight—with 3 parts of zinc oxide, 1 part of stearic acid, 30 parts of ISAF carbon black, 10 parts of silica filler, 20 parts of an aromatic oil, 2 parts of sulfur, 1.5 parts of N-cyclohexyl-2-benzothiazole sulfenamide and 1.0 part of triethanolamine by a mixing roll, and then pressing the mixture at 145° C. for 10 minutes.

Thirty parts of the powdered styrene-butadiene copolymer were mixed with 100 parts of styrene-butadiene copolymer rubber (SBR 1502) and various compounding agents in the amounts shown in Table 3 by a B-type Banbury mixer. The resulting compositions were heated at 145° C. for 45 minutes to form vulcanizates. The properties of the vulcanizates are as shown in Table 3.

TABLE 3

| | Sample No. | | | | | | |
|---|---|---|---|---|---|---|---|
| | Comparison | Present Invention | | | | Comparison | |
| | 1 | 2 | 3 | 4 | 5 | 6 | 7 |
| Recipe & physical properties | | | | | | | |
| SER 1502 (parts) | 100 | 100 | 100 | 100 | 100 | 100 | 100 |
| Powdered styrene-butadiene copolymer (parts) | 30 | 30 | 30 | 30 | 30 | 30 | — |
| (styrene/butadiene ratio, parts) | (55/45) | (60/40) | (66/34) | (71/29) | (77/23) | (88/12) | |
| Compounding Agents (parts) | | | | | | | |
| Zinc oxide | | | | 3 | | | |
| Stearic acid | | | | 2 | | | |
| HAF carbon black | | | | 50 | | | |
| Aromatic oil | | | | 5 | | | |

TABLE 3-continued

| | Sample No. | | | | | | |
|---|---|---|---|---|---|---|---|
| | Comparison | Present Invention | | | | Comparison | |
| | 1 | 2 | 3 | 4 | 5 | 6 | 7 |
| N—Phenyl-N—isopropyl-p-phenylene diamine | | | | 1 | | | |
| Phneyl-β-naphthyl amine | | | | 1 | | | |
| 6-Ethoxy-2,2,4-trimethyl-1,2-dihydroquinoline | | | | 1 | | | |
| Sulfur | | | | 1.75 | | | |
| N—Oxydiethylene-2-benzothiazole sulfenamide | | | | 1.1 | | | |
| Temperature for tan δ maximum of powdered styrene-butadiene copolymer (°C.) | −10 | −3 | +4 | +13 | +22 | +45 | — |
| Hardness (JIS) | 66 | 66 | 65 | 66 | 66 | 70 | 66 |
| Skid resistance on ice | 5 | 10 | 11 | 10 | 14 | 11 | 4 |
| Occurrence of scratch | NO | NO | NO | NO | NO | YES | NO |

It is clear from Table 3 that vulcanizates prepared from rubber blend with the powdered polymer of the present invention which has a tan δ maximum at −3° C., +4° C., +13° C. or +22° C. have a high skid resistance on ice and cause no damage to the surface of an object in contact with the vulcanizates. It is also apparent from the table that vulcanizates prepared from rubber blended with a powdered polymer which has a tan δ maximum at −10° C. have a low skid resistance on ice, and vulcanizates prepared from a rubber blended with a powdered polymer having a tan δ maximum at +45° C. cause damage to the surface of an object in contact with them.

What we claim is:

1. A rubber material capable of being formed into rubber articles such as tires and shoe soles which have an excellent grip on ice surface and which do not damage ice-free surfaces in contact with the rubber articles, said material comprising a mixture of an ordinary rubber and a powder of norbornene polymer which hardens at service temperatures on ice and softens at higher temperatures and which does not lose its shape as a powder when heated during curing or shaping, wherein the ordinary rubber is a butadiene rubber, a styrene-butadiene rubber, an isoprene rubber, or a natural rubber.

2. The rubber material of claim 1 which comprises a mixture of 100 parts by weight of the ordinary rubber and 5 to 100 parts by weight of the norbornene polymer.

3. A rubber article obtained by vulcanizing the rubber material of claim 1.

4. The rubber article of claim 3 which is a tire.

5. The rubber articles of claim 3 which is a shoe sole.

6. The rubber material of claim 1 which comprises a mixture of 100 parts by weight of the ordinary rubber and 5 to 50 parts by weight of the norbornene polymer.

7. The rubber material of claim 1 wherein the loss tangent (tan δ) of the powder of the norbornene polymer is at a maximum at a temperature in the range of −5° C. to +35° C., when the tan δ is measured by a nonresinous, forced vibration apparatus at a frequency of 110 Hertz and a heating rate of 2° C./minute.

8. The rubber article of claim 7 wherein the partice size of the powder of the norbornene polymer is larger than 0.1 mm.

* * * * *